United States Patent
Panchal

(10) Patent No.: US 12,527,604 B2
(45) Date of Patent: Jan. 20, 2026

(54) VERTEBRAL PLATE

(71) Applicant: Evolution Spine, Dallas, TX (US)

(72) Inventor: Ripul Panchal, Southlake, TX (US)

(73) Assignee: Evolution Spine, Dallas, TX (US)

( * ) Notice: Subject to any disclaimer, the term of this patent is extended or adjusted under 35 U.S.C. 154(b) by 132 days.

(21) Appl. No.: 16/703,524

(22) Filed: Dec. 4, 2019

(65) Prior Publication Data

US 2020/0170684 A1 Jun. 4, 2020

Related U.S. Application Data

(60) Provisional application No. 62/775,047, filed on Dec. 4, 2018.

(51) Int. Cl.
*A61B 17/70* (2006.01)
*A61B 17/86* (2006.01)
*A61B 17/17* (2006.01)

(52) U.S. Cl.
CPC .......... *A61B 17/7059* (2013.01); *A61B 17/86* (2013.01); *A61B 17/1728* (2013.01); *A61B 17/1757* (2013.01); *A61B 2017/8655* (2013.01)

(58) Field of Classification Search
CPC .. A61B 17/7059; A61B 17/86; A61B 17/7032
See application file for complete search history.

(56) References Cited

U.S. PATENT DOCUMENTS

| | | | |
|---|---|---|---|
| 2002/0147450 A1* | 10/2002 | LeHuec | A61B 17/1671 606/86 B |
| 2003/0045880 A1 | 3/2003 | Michelson | |
| 2005/0177245 A1* | 8/2005 | Leatherbury | A61B 17/7059 623/17.11 |
| 2006/0095134 A1* | 5/2006 | Trieu | A61F 2/442 623/17.16 |
| 2007/0299448 A1 | 12/2007 | Chin et al. | |
| 2009/0287258 A1* | 11/2009 | Vannemreddy | A61B 17/7059 606/298 |
| 2010/0152784 A1* | 6/2010 | Lowry | A61B 17/8028 623/17.11 |
| 2010/0234897 A1* | 9/2010 | Fisher | A61B 17/8042 606/280 |
| 2016/0067053 A1* | 3/2016 | Pisharodi | A61F 2/447 623/17.16 |
| 2017/0056203 A1* | 3/2017 | Gray | A61F 2/4465 |
| 2018/0036042 A1* | 2/2018 | Tipping | A61B 17/8042 |
| 2019/0209215 A1* | 7/2019 | Baynham | A61B 17/7059 |

FOREIGN PATENT DOCUMENTS

CN 203195754 9/2013

OTHER PUBLICATIONS

United States Patent & Trademark Office, (ISA/US) International Search Report and Written Opinion for PCT/US2019/064513 dated Feb. 21, 2020, 10 pp.

* cited by examiner

*Primary Examiner* — Tessa M Matthews
(74) *Attorney, Agent, or Firm* — Edwin S. Flores; Daniel J. Chalker; Chalker Flores, LLP

(57) ABSTRACT

A vertebral plate and method is disclosed. The vertebral plate comprises a frame having a triangular shape. A screw hole is present on each corner of the frame. Each screw hole is designed to receive a screw. Optionally, a viewing window is disposed within an interior of the frame.

15 Claims, 5 Drawing Sheets

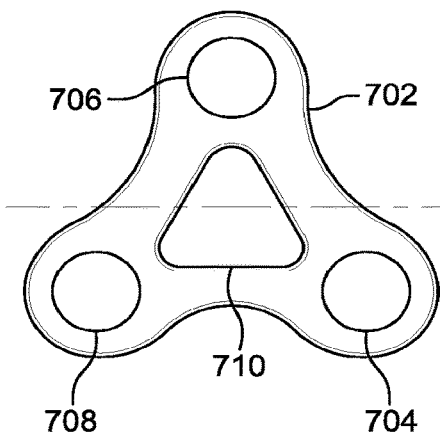
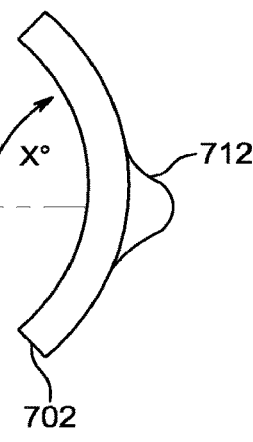
FIG. 7A     FIG. 7B     FIG. 7C
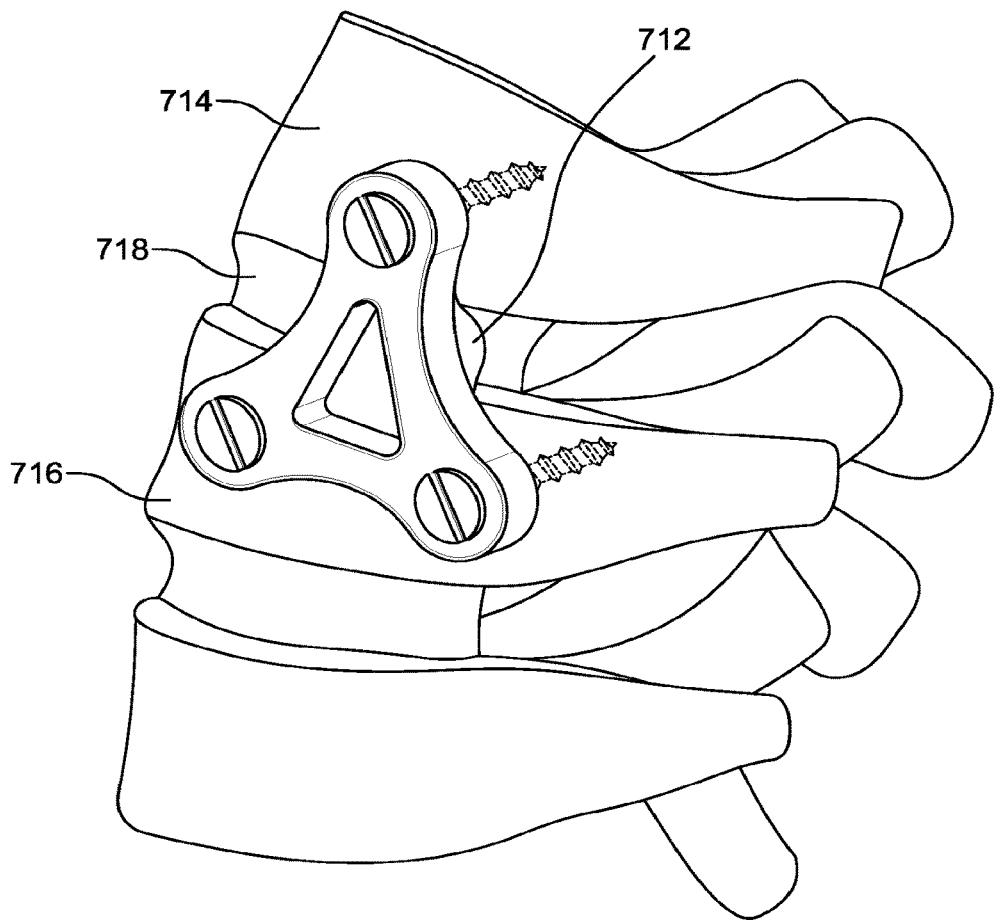
FIG. 7D

VERTEBRAL PLATE

CROSS-REFERENCE TO RELATED APPLICATIONS

This application claims priority to U.S. Provisional Application Ser. No. 62/775,047, filed Dec. 4, 2018, the entire contents of which are incorporated herein by reference.

FIELD OF THE DISCLOSURE

The present disclosure is generally related to medical apparatus, and more particularly, related to vertebral plates for retaining vertebrae.

BACKGROUND

The subject matter disclosed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Anterior cervical discectomy with fusion is an operation that involves relieving pressure placed on nerve roots and a spinal cord by a herniated disc or bone spurs. Such condition is referred to as nerve root compression. The procedure includes removing damaged intervertebral disc, which is a source of compression and placing a bone graft between vertebrae adjacent to a space left by the removed disc. The bone graft is generally an inter-vertebral-body cage filled with bone.

Currently, a vertebral plate is used to stabilize the spine and contain an intra-body cage while the spine heals. Further, various plates are used for the process of internal fixation of the cervical spine. Such plates have fixed angle, variable angle and a mixture of both with locking mechanism. However, with the usage of such plates in conjunction with inter-body cages leads to one or more problems such as the inter-body cages telescope or subside into an adjacent vertebral bodies on a delayed basis after surgery. Such problem occurs due to a variety of factors including differences in biomechanical properties of the cage in relation to the vertebral body, inadvertent destruction of the end plate during end plate preparation, poor bone quality and micromotion. Further, if subsidence becomes too great, then screws may break or loosen and the plate may fail.

Conventional vertebral plates have a complex structure with large profile. Further, several screws are required to fix these vertebral plates on vertebrae, that requires multiple screw holes to be made on the vertebrae. Therefore, there is a need for an improved low profile cervical plate that would need less number of screw holes to be drill on vertebrae of the patients.

SUMMARY OF THE INVENTION

In one embodiment, the present invention includes a vertebral plate comprising: a frame having a modified triangular shape; and a screw hole present on each corner of the frame, wherein each screw hole is designed to receive a screw. In one aspect, the vertebral plate is attached over cervical vertebrae. In another aspect, the frame is made of titanium. In another aspect, a thickness of the frame ranges from 1.9 mm to 2.4 mm. In another aspect, a size of the frame ranges from 7 mm to 12 mm. In another aspect, the frame has a curvature of up to 7 degrees. In another aspect, the screw is one of a self-tapping screw and a self-drilling screw. In another aspect, the screw has a size of 3.5 mm-4.5 mm. In another aspect, the vertebral plate further comprises a viewing window disposed within an interior of the frame. In another aspect, the vertebral plate further comprises a notch present between at least one pair of corners of the frame. In another aspect, an angle of curvature of the notch ranges from 0 to 180 degrees. In another aspect, the vertebral plate further comprises stacking a plurality of vertebral plates in a one below another configuration. In another aspect, the vertebral plate further comprises a smooth depression present on at least one edge of the frame. In another aspect, the vertebral plate further comprises a protrusion for fitting between two adjacent vertebrae. In another aspect, the vertebral plate further comprises a bend in the vertebral plate to enable medial, lateral, or caudal screw trajectory. In another aspect, the bend in the vertebral plate enables the medial, lateral, or caudal screw trajectory with a bend angle ranging from 0 to 180 degrees. In another aspect, the bend in the vertebral plate enables the medial, lateral, cephalad, caudal screw trajectory with screw recesses to direct the medial, lateral, cephalad or caudal screw trajectory.

In one embodiment, the present invention includes a vertebral plate consisting essentially of: a frame having a modified triangular shape; and a screw hole present on each corner of the frame, wherein each screw hole is designed to receive a screw. In one aspect, the vertebral plate is attached over cervical vertebrae. In another aspect, the frame is made of titanium. In another aspect, a thickness of the frame ranges from 1.9 mm to 2.4 mm. In another aspect, a size of the frame ranges from 7 mm to 12 mm. In another aspect, the frame has a curvature of up to 7 degrees. In another aspect, the screw is one of a self-tapping screw and a self-drilling screw. In another aspect, the screw has a size of 3.5 mm-4.5 mm. In another aspect, the vertebral plate further comprises a viewing window disposed within an interior of the frame. In another aspect, the vertebral plate further comprises a notch present between at least one pair of corners of the frame. In another aspect, an angle of curvature of the notch ranges from 0 to 180 degrees. In another aspect, the vertebral plate further comprises stacking a plurality of vertebral plates in a one below another configuration. In another aspect, the vertebral plate further comprises a smooth depression present on at least one edge of the frame. In another aspect, the vertebral plate further comprises a protrusion for fitting between two adjacent vertebrae. In another aspect, the vertebral plate further comprises a bend in the vertebral plate to enable medial, lateral, or caudal screw trajectory. In another aspect, the bend in the vertebral plate enables the medial, lateral, or caudal screw trajectory with a bend angle ranging from 0 to 180 degrees. In another aspect, the bend in the vertebral plate enables the medial, lateral, cephalad, caudal screw trajectory with screw recesses to direct the medial, lateral, cephalad or caudal screw trajectory.

In another embodiment, the present invention includes a method of intervertebral fixation comprising: identifying a patient in need of cervical intervertebral fixation; providing a frame having a modified triangular shape; and a screw hole present on each corner of the frame, wherein each screw hole is designed to receive a screw; and affixing the frame to a first and a second cervical vertebrae with a screw at each screw hole present on each corner of the frame to provide intervertebral fixation. In one aspect, the method further comprises the step of affixing an additional frame between the first or second cervical vertebrae and a third vertebrae adjacent the first or second cervical vertebrae. In one aspect, the vertebral plate is attached over cervical vertebrae. In another aspect, the frame is made of titanium. In another aspect, a thickness of the frame ranges from 1.9 mm to 2.4 mm. In another aspect, a size of the frame ranges from 7 mm to 12 mm. In another aspect, the frame has a curvature of up to 7 degrees. In another aspect, the screw is one of a self-tapping screw and a self-drilling screw. In another aspect, the screw has a size of 3.5 mm-4.5 mm. In another aspect, the vertebral plate further comprises a viewing window disposed within an interior of the frame. In another aspect, the vertebral plate further comprises a notch present between at least one pair of corners of the frame. In another aspect, an angle of curvature of the notch ranges from 0 to 180 degrees. In another aspect, the vertebral plate further comprises stacking a plurality of vertebral plates in a one below another configuration. In another aspect, the vertebral plate further comprises a smooth depression present on at least one edge of the frame. In another aspect, the vertebral plate further comprises a protrusion for fitting between two adjacent vertebrae. In another aspect, the vertebral plate further comprises a bend in the vertebral plate to enable medial, lateral, or caudal screw trajectory. In another aspect, the bend in the vertebral plate enables the medial, lateral, or caudal screw trajectory with a bend angle ranging from 0 to 180 degrees. In another aspect, the bend in the vertebral plate enables the medial, lateral, cephalad, caudal screw trajectory with screw recesses to direct the medial, lateral, cephalad or caudal screw trajectory.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 7A illustrates a front view of a vertebral plate 702, and FIG. 7B and FIG. 7C illustrate side views of the vertebral plate 702 comprising a protrusion 712, according to an embodiment of the present disclosure.

FIG. 7D illustrates the vertebral plate 702 fitted between a first vertebra 714 and a second vertebra 716, according to an embodiment of the present disclosure.

DETAILED DESCRIPTION OF THE INVENTION

Figure 1:
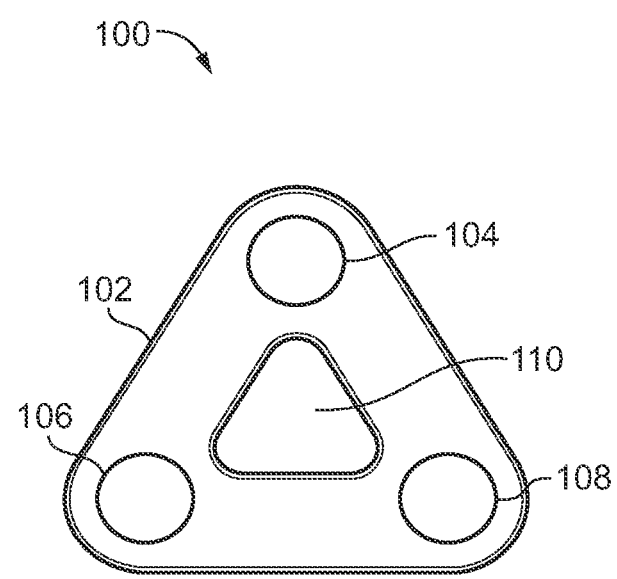
FIG. 1 illustrates a front view of a vertebral plate 100, according to an embodiment of the present disclosure.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not limit the invention, except as outlined in the claims.

The present invention includes a vertebral plate comprising: a frame having a modifies triangular shape; and a screw hole present on each corner of the frame, wherein each screw hole is designed to receive a screw; wherein the vertebral plate is attached over cervical vertebrae; wherein the frame is made of titanium; wherein thickness of the frame ranges from 1.9 mm to 2.4 mm; wherein size of the frame ranges from 7 mm to 12 mm; wherein the frame has a curvature of up to 7 degrees; wherein the screw is one of a self-tapping screw and a self-drilling screw; wherein the screw has a size of 3.5 mm-4.5 mm; wherein, further comprising a viewing window disposed within an interior of the frame. The vertebral plate further comprising a notch present between at least one pair of corners of the frame; wherein an angle of curvature of the notch ranges from 0 to 180 degrees. The vertebral plate further comprising stacking a plurality of vertebral plates in a one below another configuration; wherein, further comprising a smooth depression present on at least one edge of the frame; wherein, further comprising a protrusion for fitting between two adjacent vertebrae; wherein, further comprising a bend in the vertebral plate to enable medial, lateral, or caudal screw trajectory; wherein the bend in the vertebral plate enables the medial, lateral, or caudal screw trajectory with a bend angle ranging from 0 to 180 degrees; wherein the bend in the vertebral plate enables the medial, lateral, cephalad, caudal screw trajectory with screw recesses to direct the medial, lateral, cephalad or caudal screw trajectory. Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

FIG. 1 illustrate illustrates a vertebral plate 100, according to an embodiment. The vertebral plate 100 may be used for implantation on one or more anterior portions of cervical vertebrae. The vertebral plate 100 may be used for single level or adjacent level. The vertebral plate 100 may be positioned upon at least two vertebrae, and below an intervertebral disc to be treated and/or removed. The vertebral plate 100 may include a frame 102, having a triangular shape. The triangular shape may correspond to an isosceles triangle or an equilateral triangle. Further, the frame 102 may be made up of titanium or other suitable rigid implant material.

In one embodiment, the frame 102 may comprise a screw hole present on each corner of the frame 102, i.e. a first screw hole 104, a second screw hole 106, and a third screw hole 108, collectively referred as screw holes. The screw holes may be designed to receive screws. Screws of size 3.5 mm and 4.0 mm may fit into the screw holes. It should be noted that a screw of 4.0 mm size may serve as a rescue screw if a screw of size 3.5 mm spin around in a bone. The screws may be of one or more types such as, but not limited to, self-tapping screws and self-drilling screws. It should be noted that multiple screw options may provide intra-operative flexibility.

In one embodiment, fixed angle screws, variable angle screws, and hybrid angle screws may be used with self-tapping and self-drilling tips in order to obviate one or more bone preparation steps. Further, the fixed angle screws, variable angle screws, and hybrid angle screws may be placed using a Drill, Tap, and Screw (DTS) Guide. Further, a trajectory of the screws through the DTS Guide may be fixed. It should be noted that the variable angle screws may be used with available angle drill guide. In one embodiment, the screws may be color-coded based on screw diameter.

In one embodiment, the screws may be covered with a pivot cover (not shown). In one case, a ring may be placed over the screws. In an example, a locking ring may be deflected medially by a taper of the screws which may allow the screws to pass by the locking ring, as the screws advance into the bone. It should be noted that the locking ring may capture the screws. Further, the frame 102 may comprise a viewing window 110 disposed within an interior of the frame 102. The viewing window 110 may allow direct visualization between vertebrae.

Figure 2:
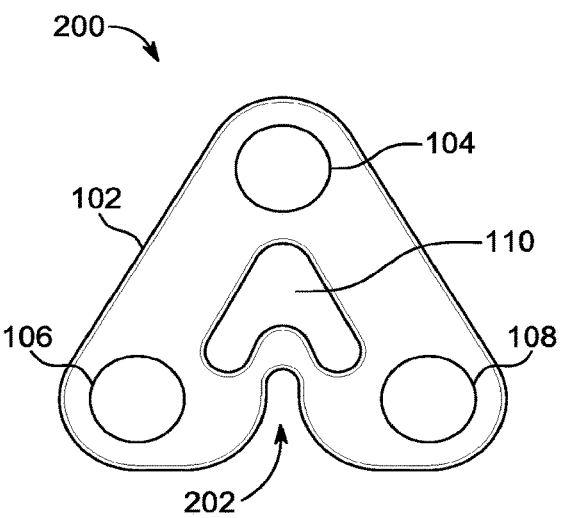
FIG. 2 illustrates a front view of a vertebral plate 200, according to an embodiment of the present disclosure.
Figure 3:
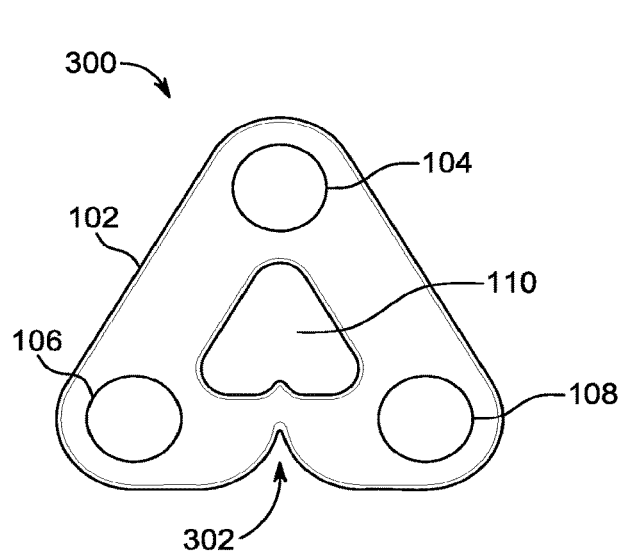
FIG. 3 illustrates a front view of a vertebral plate 300, according to an embodiment of the present disclosure.
Figure 4:
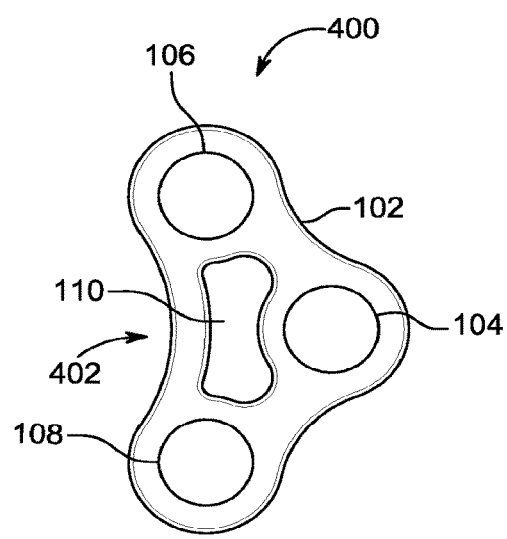
FIG. 4 illustrates a front view of a vertebral plate 400, according to an embodiment of the present disclosure.

In one embodiment, as illustrated in FIG. 2, a notch 110 may be present between at least one pair of corners of the frame 102. Further, as illustrated in FIG. 3, a notch 302 having a different shape may be present between at least one pair of corners of the frame 102. The notch 202 and the notch 302 may allow for better visualization of cervical vertebrae. Further, as illustrated in FIG. 4, a smooth depression 402 may be present on at least one edge of the frame 102. In one case, thickness of the frame 102 may be 1.9 mm to 2.4 mm. The thickness of the frame 102 may be determined by mechanical testing. Further, a size of the frame 102 may range from 7 mm to 12 mm. Further, a curvature of the frame 102 may correspond to 7 degrees. It should be noted that average degrees of segmental lordosis range from 4 to 8 degree, for a level. In an example, Cervical Spine Locking Plate (CSLP) may be used in an anterior plating of cervical spine (i.e., C2-T2 location) for an internal fixation in a treatment of instabilities associated with fractures/dislocations, degenerative diseases, tumors, partial or total spondylectomy.

Figure 5:
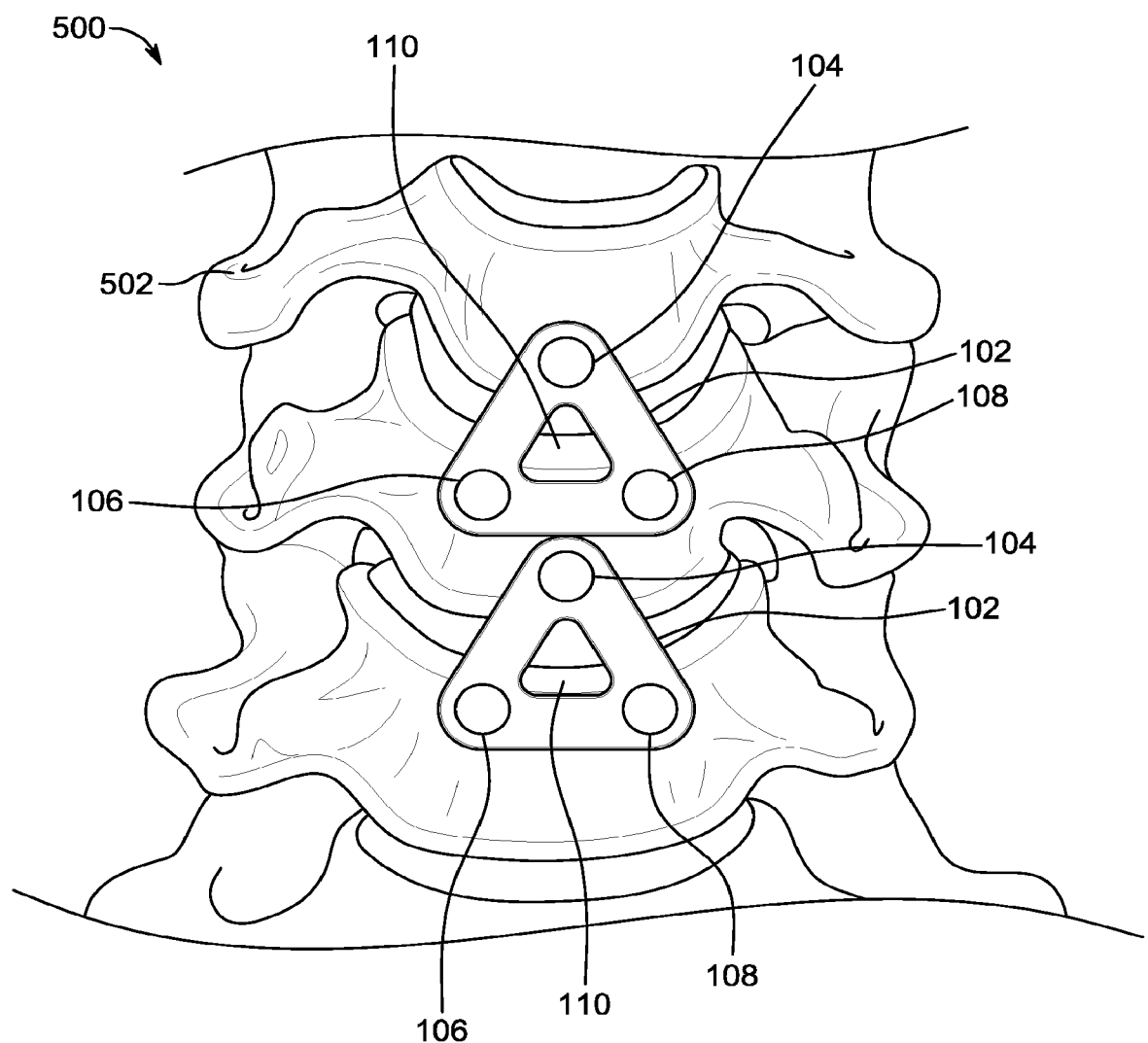
FIG. 5 illustrates placement of the vertebral plate 100 on cervical vertebrae, according to an embodiment of the present disclosure.

As shown in FIG. 5, during a surgical operation, a surgeon may attach the vertebral plate 100 to cervical vertebrae 502 of a patient. The vertebral plate 100 may be implanted on one or more anterior or ventral portions of the cervical vertebrae 202. The vertebral plate 100 may be temporarily affixed to vertebrae by using the screws fastened through the screw holes 104, 106, and 108. In one case, prefixation pins may be placed in the screw holes 104, 106, and 108, using a pin driver. Further, standard anterior exposure techniques may be used to expose one or more spinal segments to be fused. Further, a properly sized vertebral plate 100 may span a distance between caudal and cephalad. It should be noted that a left-sided surgical or right-sided surgical approach may be used for the placement of the vertebral plate 100. Therefore, such vertebral plate 100 may include less number of screws, have adequate stability, properly mobilize or immobilize (i.e. de novo or reversion anterior cervical discectomy, fusion technique, etc.), and work with any type of surgery.

Figure 6:
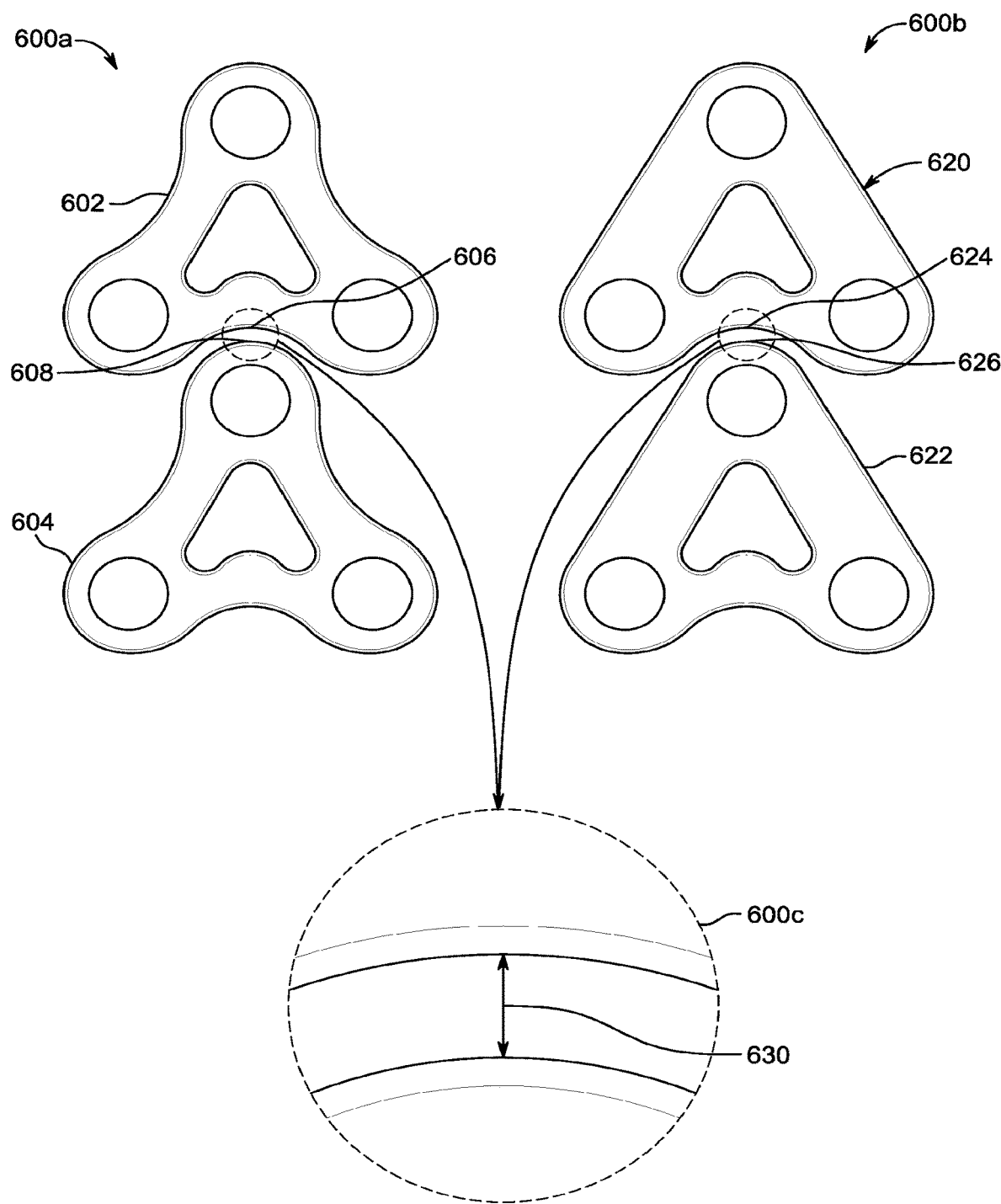
FIG. 6 illustrates a first stacked arrangement 600a and a second stacked arrangement 600b of vertebral plates, and a magnified view 600c of the first stacked arrangement 600a and the second stacked arrangement 600b, according to an embodiment of the present disclosure.

A first stacked arrangement 600a and a second stacked arrangement 600b of vertebral plates, and a magnified view 600c of the first stacked arrangement 600a and the second stacked arrangement 600b are henceforth explained with reference to FIG. 6. The first stacked arrangement 600a may be provided between a vertebral plate 602 and a vertebral plate 604. The vertebral plate 602 may comprise a notch 606 for allowing a vortex 608 of the vertebral plate 604 to fit into or around a base of the vertebral plate 602. Similarly, the second stacked arrangement 600b may be provided between a vertebral plate 620 and a vertebral plate 622. The vertebral plate 620 may comprise a notch 624 for allowing a vortex 626 of the vertebral plate 622 to fit into or around a base of the vertebral plate 620. In one case, curvature of the notch 606 and the notch 624 may range from 0 to 180 degrees. The magnified view 600c of the stacked arrangements 600a and 600b shows a gap 630 present between notch and vertex of vertebral plates. The gap 630 may be present or contact between vertebral plates may be made based on surgical requirements for a patient. Further, if present, the gap 630 could be varied up to a predefined value to suit medical condition of a patient.

In one embodiment, referring to FIG. 7A illustrating a front view of a vertebral plate 702, structure of the vertebral plate 702 is explained. The vertebral plate 702 may comprise three screw holes i.e. a first screw hole 704, a second screw hole 706, and a third screw hole 708, where each screw hole is present at a corner of the vertebral plate 702. The screw holes may be designed to receive screws. The screw holes may allow passing of screws of size 3.5 mm and 4.0 mm. It should be noted that a screw of 4.0 mm size may serve as a rescue screw if a screw of size 3.5 mm spin around in a bone. The screws may be of one or more types such as, but not limited to, self-tapping screws and self-drilling screws. It should be noted that multiple screw options may provide intra-operative flexibility. Further, a viewing window 710 may be disposed within an interior of the vertebral plate 702. The viewing window 710 may allow direct visualization during a surgical operation.

Referring to FIG. 7B illustrating a side view of the vertebral plate 702, structure of the vertebral plate 702 is explained. Further, as illustrated in FIG. 7B, the vertebral plate 702 comprises of a protrusion 712. Further, as illustrated in FIG. 7C, the vertebral plate 702 may be bent such that a bend angle x° may be present between a base plane and a centre line of the vertebral plate 702. The bend angle x° may range from 0 to 180 degrees. In one case, the bent present in the vertebral plate 702 may enable medial, lateral, cephalad or caudal screw trajectory for low profile, over the vertebral body application. Also as an embodiment, related to FIG. 7C, a curve in the vertebral plate 702 may be provided in the opposite direction to provide cervical lordosis of the spine to enable use of a larger plate. Further, as illustrated in FIG. 7D, the vertebral plate 702 may fit onto a first vertebra 714 and a second vertebra 716. The protrusion 712 may fit within a space 718 present between the first vertebra 714 and the second vertebra 716. The protrusion 712 and the bent may allow adequate positioning of the vertebral plate 702 onto multiple vertebrae. Further, multiple such vertebral plates could be stacked in one below another configuration, as previously illustrated and explained using FIG. 5 and FIG. 6 for revision surgery.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited features, elements, components, groups, integers, and/or steps, but do not exclude the presence of other unstated features, elements, components, groups, integers and/or steps. In embodiments of any of the compositions and methods provided herein, "comprising" may be replaced with "consisting essentially of" or "consisting of". As used herein, the term "consisting" is used to indicate the presence of the recited integer (e.g., a feature, an element, a characteristic, a property, a method/process step or a limitation) or group of integers (e.g., feature(s), element(s), characteristic(s), property(ies), method/process steps or limitation(s)) only. As used herein, the phrase "consisting essentially of" requires the specified features, elements, components, groups, integers, and/or steps, but do not exclude the presence of other unstated features, elements, components, groups, integers and/or steps as well as those that do not materially affect the basic and novel characteristic(s) and/or function of the claimed invention.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

What is claimed is:

1. A vertebral plate comprising:
   a frame having a modified triangular shape;
   a protrusion integral with the frame for fitting only into a peripheral space between two adjacent vertebrae;
   a pointed notch present in an outer edge of the frame between two corners of the frame;

a screw hole present on each corner of the frame, wherein each screw hole is designed to receive a screw; and
a pivot cover for each screw hole.

2. The vertebral plate of claim 1, wherein the vertebral plate is configured to be attached over cervical vertebrae.

3. The vertebral plate of claim 1, wherein the frame is made of titanium.

4. The vertebral plate of claim 1, wherein a thickness of the frame ranges from 1.9 mm to 2.4 mm.

5. The vertebral plate of claim 1, wherein a width of the frame is 7 mm to 12 mm.

6. The vertebral plate of claim 1, wherein the frame has a curvature of up to 7 degrees.

7. The vertebral plate of claim 1, wherein each screw hole is configured to receive either a self-tapping screw or a self-drilling screw.

8. The vertebral plate of claim 1, wherein each screw hole is configured to receive a screw having a size of 3.5 mm to 4.5 mm.

9. The vertebral plate of claim 1, further comprising a viewing window disposed within an interior of the frame.

10. The vertebral plate of claim 1, further comprising a smooth depression present on at least one edge of the frame.

11. The vertebral plate of claim 1, further comprising a bend in the vertebral plate to enable medial, lateral, or caudal screw trajectory.

12. The vertebral plate of claim 11, wherein the bend in the vertebral plate enables the medial, lateral, or caudal screw trajectory with a bend angle ranging from 0 to 180 degrees.

13. The vertebral plate of claim 11, wherein the bend in the vertebral plate enables the medial, lateral, cephalad, caudal screw trajectory with screw recesses to direct the medial, lateral, cephalad or caudal screw trajectory.

14. A system of vertebral plates comprising a configuration in which a plurality of vertebral plates are stacked one below another, wherein each plate is the vertebral plate of claim 1.

15. A vertebral plate consisting essentially of:
a frame having a modified triangular shape;
a screw hole present on each corner of the frame, wherein each screw hole is designed to receive a screw;
a protrusion integral with the frame for fitting only into a peripheral space between two adjacent vertebrae positioned between the screw holes at each corner of the frame;
a pointed notch present in an outer edge of the frame between two corners of the frame; and
a pivot cover for each screw hole.

* * * * *